United States Patent
Fulton

(10) Patent No.: US 10,270,869 B2
(45) Date of Patent: Apr. 23, 2019

(54) CONTEXTUAL WEB SESSION AND IVR INTEGRATION

(71) Applicant: ADP, LLC, Roseland, NJ (US)

(72) Inventor: Keith Wilson Fulton, South Orange, NJ (US)

(73) Assignee: ADP, LLC, Roseland, NJ (US)

( * ) Notice: Subject to any disclaimer, the term of this patent is extended or adjusted under 35 U.S.C. 154(b) by 426 days.

(21) Appl. No.: 15/089,256

(22) Filed: Apr. 1, 2016

(65) Prior Publication Data

US 2017/0286132 A1   Oct. 5, 2017

(51) Int. Cl.
| | |
|---|---|
| G06F 3/048 | (2013.01) |
| H04L 29/08 | (2006.01) |
| G06F 3/16 | (2006.01) |
| G06F 9/451 | (2018.01) |
| H04L 12/58 | (2006.01) |
| H04L 12/18 | (2006.01) |

(52) U.S. Cl.
CPC .............. *H04L 67/22* (2013.01); *G06F 3/167* (2013.01); *G06F 9/453* (2018.02); *H04L 51/22* (2013.01); *H04L 67/02* (2013.01); *H04L 67/14* (2013.01); *H04L 12/1827* (2013.01); *H04L 51/36* (2013.01)

(58) Field of Classification Search
CPC .......... G06F 3/00; G06F 17/30; G06F 3/0482; G06F 9/44; G06T 13/00
See application file for complete search history.

(56) References Cited

U.S. PATENT DOCUMENTS

| | | | |
|---|---|---|---|
| 6,418,199 B1 | 7/2002 | Perrone | |
| 6,762,692 B1 * | 7/2004 | Mingot | G10L 15/22 340/12.54 |
| 7,813,485 B2 | 10/2010 | Yin et al. | |
| 7,865,829 B1 * | 1/2011 | Goldfield | G06F 9/453 715/708 |
| 8,600,018 B2 | 12/2013 | Gao et al. | |
| 8,892,446 B2 | 11/2014 | Cheyer et al. | |
| 9,148,456 B2 * | 9/2015 | Vendrow | H04L 65/1083 |
| 9,582,246 B2 * | 2/2017 | Klein | G06F 3/167 |
| 2005/0268234 A1 * | 12/2005 | Rossi, Jr. | G06F 9/453 715/705 |
| 2006/0080608 A1 * | 4/2006 | Marggraff | G06F 3/0481 715/727 |
| 2008/0250026 A1 | 10/2008 | Linden et al. | |

(Continued)

FOREIGN PATENT DOCUMENTS

WO   WO2009079252 A1   6/2009

*Primary Examiner* — Rashawn N Tillery
(74) *Attorney, Agent, or Firm* — Yee & Associates, P.C.

(57) ABSTRACT

A method and apparatus provide assistance for an application. An assistance manager that identifies user input requesting assistance with a location within the page of the application displayed on a display system for a client device. The assistance manager identifies session information for the application by the computer system in response to identifying the user input requesting assistance. The assistance manager generates synchronized menu options within the application for an interactive voice response system based on the session information identified for the application. The assistance manager presents the synchronized menu options to the user within the interactive voice response system to provide the assistance.

39 Claims, 7 Drawing Sheets

(56) References Cited

U.S. PATENT DOCUMENTS

| | | | |
|---|---|---|---|
| 2009/0113346 A1* | 4/2009 | Wickramasuriya | G06F 3/0481 715/825 |
| 2012/0213343 A1 | 8/2012 | Gao et al. | |
| 2014/0219438 A1 | 8/2014 | Brown et al. | |
| 2015/0172463 A1 | 6/2015 | Quast et al. | |
| 2017/0206096 A1* | 7/2017 | Lubow | G06F 3/0482 |

* cited by examiner

CONTEXTUAL WEB SESSION AND IVR INTEGRATION

BACKGROUND INFORMATION

1. Field

The present disclosure relates generally to an improved computer system and, in particular, to a method and apparatus for providing assistance to users of the computer system. Still more particularly, the present disclosure relates to a method and apparatus for providing users assistance with applications running on a computer system.

2. Background

Applications are commonly run with a connection to the Internet. The applications may be used for different functions, such as e-mail, instant messaging, online retail sales, online auctions, payroll, benefits administration, financial transactions, report generation, and many other functions. These applications include, for example, web applications that run in browsers.

A web application is a server/client application in which the client runs on a web browser. Web applications are popular because of the widespread use of web browsers. The web browsers provide access to a server on the World Wide Web, which is also referred to just as the Web.

With web applications using a web browser as a client, updating and maintaining web applications may occur without distributing and installing software on client computers. Further, web applications may be used on different platforms. These web applications are considered online applications because they are able to connect to the World Wide Web, a local intranet, or some other network.

Assistance for online applications is provided in a number of different ways. For example, applications may have help topics, a frequently asked questions (FAQ) page, forums, a help desk, an automated voice response system, or online assistance.

Help topics and FAQ pages may be useful for many questions or issues that may arise in using a web application. However, a user may need assistance with an issue that is not found in the help topics or FAQ pages.

In this instance, forums may provide answers for issues that are not addressed by help topics or FAQ pages. Forums, however, may not provide an answer to a particular issue that a user has with an application. Additionally, forums also may be difficult to navigate or search for answers to issues that a user may have with an application.

Online assistance may include sending an e-mail message or filling out a request for assistance in an application. This type of process, however, often takes more time than desired. For example, a response to a message may not occur for an hour or a day. The user, however, in the meantime, is unable to perform a desired function or action using the application. As a result, the user may encounter delays in performing tasks using the application.

Online assistance may also include an ability to message a representative in real-time. This type of assistance may be helpful to the user and more quickly resolve an issue. Online assistance, however, has limits. Often times, the instructions provided through messaging may not be as clear as desired to allow the user to resolve the issue. For example, instructions on how to navigate through an application to change settings, perform a desired function, or some other action may be hard to understand through text.

In some cases, online assistance may involve allowing the representative to remotely take control of the computer or device in which the user is located. This type of remote assistance may be unavailable in some organizations because of security concerns.

Further, live online assistance through messaging remote assistance may be more time-consuming and costly than desired. Also, depending on the need for assistance, access to a live representative may not be available when desired.

Therefore, it would be desirable to have a method and apparatus that take into account at least some of the issues discussed above, as well as other possible issues. For example, it would be desirable to have a method and apparatus that overcome a technical problem with obtaining assistance with an issue for an application as quickly as desired.

SUMMARY

An embodiment of the present disclosure provides a method for providing assistance for an application. The method comprises identifying user input requesting assistance with a location within the page of the application displayed on a display system for a client device by a computer system. Further, the method comprises identifying session information for the application by the computer system in response to identifying the user input requesting assistance. Still further, the method comprises generating synchronized menu options by the computer system within the application for an interactive voice response system based on the session information identified for the application. Still further, the method comprises presenting the synchronized menu options to the user within the interactive voice response system by the computer system to provide the assistance.

Another embodiment of the present disclosure provides a computer system. The computer system comprises an assistance manager that identifies user input requesting assistance with a location within the page of the application displayed on a display system for a client device. Further, the assistance manager identifies session information for the application by the computer system in response to identifying the user input requesting assistance. Still further, the assistance manager generates synchronized menu options within the application for an interactive voice response system based on the session information identified for the application. Still further, the assistance manager presents the synchronized menu options to the user within the interactive voice response system to provide the assistance.

Yet another embodiment of the present disclosure provides a computer program product for providing assistance for an application. The computer program product comprises a computer readable storage media, first program code, second program code, third program code, and fourth program code. The first program code, the second program code, the third program code, and the fourth program code are stored on the computer readable storage media. The first program code, when executed by a computer system, identifies user input requesting assistance with a location within the page of the application displayed on a display system for a client device. The second program code, when executed by the computer system, identifies session information for the application by the computer system in response to identifying the user input requesting assistance. The third program code, when executed by the computer system, generates synchronized menu options within the application for an interactive voice response system based on the session information identified for the application. The fourth program code, when executed by the computer system, presents the synchronized menu options to the user within the interactive voice response system to provide the assistance.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that an increased speed at which a user can obtain assistance for an issue is desirable. Further, the illustrative embodiments recognize and take into account that, in addition to providing access more quickly, an inability to provide assistance that resolves an issue is also desirable. The illustrative embodiments also recognize and take into account that providing this type of assistance while reducing the need for live operators being online is desirable.

The illustrative embodiments recognize and take into account that one manner in which assistance may be provided is through an interactive voice response system. The illustrative embodiments also recognize and take into account that interactive voice response systems with audio instructions are often useful in providing a user with assistance for an issue. The illustrative embodiments recognize and take into account, however, that applications may not provide for integrated interactive voice response systems capable of sharing information between the two systems and therefore require duplicate information from the user. Further, the illustrative embodiments recognize and take into account that the organization providing support for the application may maintain a support center that staffs live operators to provide users with assistance for the application. The illustrative embodiments recognize and take into account, however, that this support center may require more resources than desired. For example, live operators staffed in a support center use resources, such employment resources, monetary resources, bandwidth for delivery, and other resources.

Thus, the illustrative embodiments provide a method and apparatus for providing online assistance to users of applications. In one illustrative example, a method for providing assistance for an application is present. A computer system identifies user input requesting assistance with a location within the page of the application displayed on a display system for a client device. The computer system identifies session information for the application in response to identifying the user input requesting assistance. The computer system generates synchronized menu options within the application for an interactive voice response system based on the session information identified for the application. The computer system presents the synchronized menu options to the user within the interactive voice response system to provide the assistance.

Figure 1:
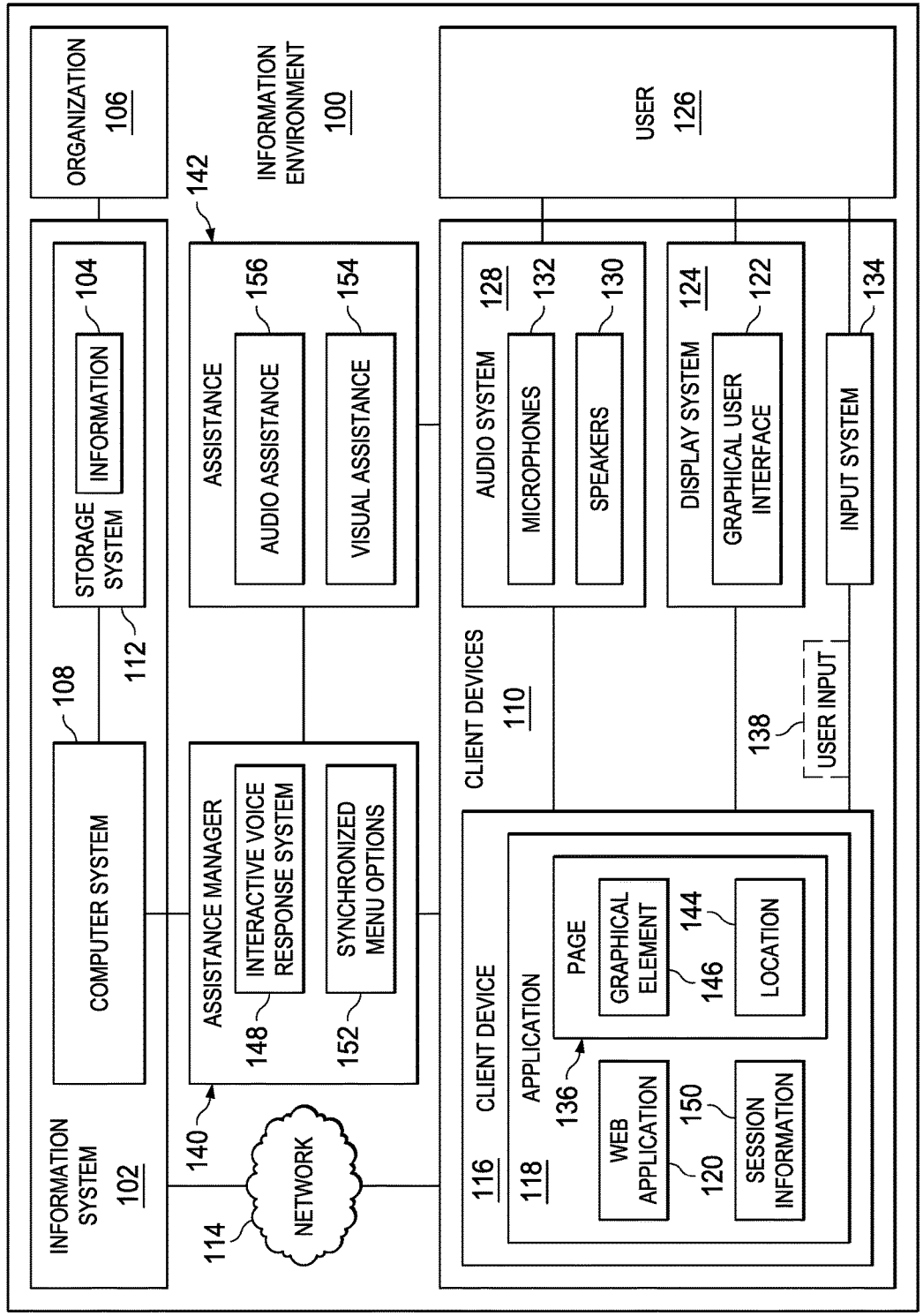
FIG. 1 is a block diagram of an information environment in accordance with an illustrative embodiment.

With reference now to the figures and, in particular, with reference to FIG. 1, an illustration of a block diagram of an information environment is depicted in accordance with an illustrative embodiment. In this illustrative example, information environment 100 includes information system 102. Information system 102 manages information 104 about organization 106.

Organization 106 may be, for example, a corporation, a partnership, a charity, a city, a government agency, or some other suitable type of organization. Information 104 about organization 106 may include, for example, at least one of information about people, products, benefits, payroll, research, product analysis, business plans, financials, or some other information relating to organization 106.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combination of these items may be present. In some illustrative examples, "at least one of" may be, for example, without limitation, two of item A; one of item B; and ten of item C; four of item B and seven of item C; or other suitable combinations.

Information system 102 may be selected from one of an employee information system, a research information system, a sales information system, an accounting system, a payroll system, or some other type of information system that stores and provides access to information 104 about organization 106. As depicted, information system 102 includes computer system 108 through which client devices 110 may access information 104. In this illustrative example, information 104 may be located in storage system 112 for computer system 108. The access may include at least one of reading, writing, modifying, or operating on information 104. Client devices 110 may communicate with computer system 108 through network 114.

As depicted, computer system 108 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

In this illustrative example, client devices 110 are physical hardware in the form of data processing systems that may be selected from at least one of a desktop computer, a laptop computer, a mobile phone, a kiosk, a tablet, or some other suitable type of data processing system. In one illustrative example, client device 116 in client devices 110 runs application 118 in a web browser as web application 120 displayed in graphical user interface 122 on display system 124 for client device 116. Output from client device 116 may be heard by user 126 through audio system 128 for client device 116, in addition to being displayed on display system 124.

Client device 116 is a physical hardware system. Client device 116 may be selected from one of a personal computer, a workstation, a kiosk, a laptop computer, a mobile phone, a tablet computer, a game console, or some other suitable type of data processing system.

As depicted, display system 124 is a physical hardware system and includes one or more display devices. The display devices may include at least one of a light emitting diode (LED) display, a liquid crystal display (LCD), an organic light emitting diode (OLED) display, or some other suitable display device. Audio system 128 is a hardware system that generates and detects sound. Audio system 128 may include one or more devices that generate sound. For example, audio system 128 may include one or more speakers 130. Audio system 128 may include one or more devices that detect sound. For example, audio system 128 may include one or more microphones 132.

User 126 is a human being who interacts with application 118 through input system 134. As depicted, input system 134 is a physical hardware system and includes at least one of a mouse, a keyboard, a trackball, a touchscreen, a stylus, a motion sensing input device, a cyberglove, or some other suitable type of input device.

As depicted, application 118 is a software application that performs at least one of retrieving, presenting, or traversing information 104. When application 118 take the form of web application 120, web application 120 performs at least one of retrieving, presenting, or traversing information that may be found in resources on the World Wide Web. Although web application 120 is typically used to access information on the World Wide Web, web application 120 also may be used to access information on web servers in private networks or in file systems.

In this illustrative example, application 118 running on client device 116 is web application 120 that accesses information 104. As depicted, application 118 includes page 136. User 126 may generate user input 138 through input system 134 into page 136 in interacting with application 118.

Page 136 is a document for application 118 that may be displayed in graphical user interface 122 of display system 124. Page 136 is a file or other data structure that can be displayed on display system 124. Page 136 may be, for example, a static web page or a dynamic web page in this illustrative example.

Web application 120 is also referred to as an online application. Web application 120 is an application in which some or all parts of the application are downloaded each time the application is run.

Although described as web application 120 in this example, application 118 may be implemented in other forms in other illustrative examples. For example, application 118 may be an application for a mobile phone downloaded from a digital distribution platform that distributes applications to mobile phones, tablet computers, or other similar devices. These types of applications may also be referred to as native applications. Native applications take advantage of features found on a mobile phone. For example, a native application may access information from a global positioning system unit, an accelerometer, or some other hardware or software components on the mobile phone. Additionally, native applications may also include components for accessing web content without using a web browser. For example, web application 120 may include components to interact with a server on the Web using standard web protocols.

In yet another illustrative example, application 118 may be an application that runs on a mobile phone. This application may be a hybrid in which the application has an integrated web browser or has access to the already present web browser on the mobile phone.

Application 118 may perform one or more different functions. For example, application 118 may be selected from at least one of an accounting application, a human resources application, a benefits administration program, a database application, or some other type of application. In these different forms, application 118 has a connection to network 114, such as the Internet. In this manner, application 118 is an online application when application 118 has the capability of connecting to the Internet or some other network to access information 104 or communicate with other applications, programs, or services on other data processing systems.

As depicted, when using application 118, user 126 may encounter difficulty in using application 118. For example, user 126 may have difficulty entering data into fields on page 136. As another example, user 126 may have difficulty in making selections from options provided on page 136.

In this illustrative example, assistance manager 140 provides assistance for application 118 to user 126. Assistance manager 140 may be implemented in software, hardware, firmware, or a combination thereof. When software is used, the operations performed by assistance manager 140 may be implemented in program code configured to be loaded and run on hardware, such as a processor unit. When firmware is used, the operations performed by assistance manager 140 may be implemented in program code and data and stored in persistent memory to run on a processor unit. When hardware is employed, the hardware may include circuits that operate to perform the operations in assistance manager 140.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In the illustrative example, assistance manager 140 is part of application 118. In other examples, assistance manager 140 may be a plug-in for a web browser or some other component that is part of or separate from web browser used by client device 116 to execute web application 120.

As depicted, assistance manager 140 monitors for user input 138 to page 136 for application 118 displayed on display system 124 for client device 116. Assistance manager 140 identifies when assistance 142 is needed by analyzing user input 138 for location 144 in application 118 and, in particular, location 144 on page 136 for application 118. In other words, assistance manager 140 identifies when assistance 142 is needed for location 144 in page 136 for application 118 based on user input 138 to page 136.

As depicted, location 144 includes at least one of a text box, a check box, a drop-down menu, a region, or some other element in page 136 for application 118 where user input 138 may be made. The region in location 144 may include multiple graphical elements that receive user input. For example, the region may include three check boxes, a text box and a checkbox, or some other combination of graphical elements in which user input 138 may be entered into application 118 through page 136.

In one embodiment, user 126 can request assistance 142 with location 144 by interacting with graphical element 146 through user input 138. Assistance manager 140 displays graphical element 146 on page 136 for application 118. Graphical element 146 is displayed for web application 120 in a web browser displayed on display system 124. In other illustrative examples, graphical element 146 may be a separate component from web application 120. Graphical element 146 may be, for example an icon, in-line element, or any other type of graphical element.

In response to detecting an interaction with graphical element 146, assistance manager 140 initiates interactive voice response system 148. Interactive voice response system 148 allows user 126 to interact with and obtain assistance 142 for application 118 through voice inputs. User 126 inputs user input 138 in the form of sound to microphones 132 to access assistance 142.

In one illustrative embodiment, interactive voice response system 148 retrieves session information 150 for application 118. Session information 150 information describing the state of application 118. Session information 150 can include, for example, personal identifying information of user 126, state information for application 118, and clickstream information for user input 138.

As used herein, personal identifying information is information that can be used on its own or with other information to identify, contact, or locate user 126, or to identify user 126 in the context of application 118. In one illustrative example, personal identifying information is login information submitted by user 126 to application 118. State information is the contents of memory locations storing variable values for application 118 at a particular point in the execution of application 118. Clickstream information is a record of the parts of page 136, including location 144, that user 126 attempts to access through user input 138 while using application 118. As user 126 attempts to interact with location 144 of page 136, user input 138 is logged as clickstream information.

In one illustrative example, assistance manager 140 logs clickstream information in session information 150 on a client device 116. Alternatively, assistance manager 140 can log clickstream information as information 104 stored on storage system 112 of information system 102.

Assistance manager 140 analyzes session information 150. In one illustrative sample, assistance manager 140 performs a statistical comparison of session information 150 to information 104 in order to determine a probable subject matter of the attempted interaction of user input 138 with location 144 of page 136. Assistance manager 140 extracts various parameters from session information 150. Assistance manager 140 compares these parameters to statistical models of information 104 to determine similarities using known statistical classification methods, such as K-nearest neighbor, Gaussian mixture modeling, support vector machines, vector quantization, hidden Markov modeling, and multivariate auto-regression modeling. The probable subject matter, or a number of probable subject matter, can then be determined.

Assistance manager 140 generates synchronized menu options 152 based on probable subject matter identified from session information 150. Synchronized menu options 152 is a list of options, topics, or commands designed to provide user 126 with assistance 142 for interacting with application 118 to access information 104 corresponding to the identified probable subject matter.

In an illustrative example, synchronized menu options 152 are presented aurally to user 126 through speakers 130 of audio system 128. In another illustrative example, synchronized menu options 152 are presented both aurally through speakers 130 of audio system 128 and visually through displayed on graphical user interface 122 of display system 124.

User 126 can select a particular one of synchronized menu options 152. In one illustrative embodiment, user 126 enters user input 138 as sound input through microphone 132 that selects from synchronized menu options 152. Alternatively, or in conjunction with sound input, user 126 enters user input 138 to input system 134 interacting with synchronized menu options 152 as displayed on graphical user interface 122.

In this manner, assistance 142 with location 144 is provided by interactive voice response system 148. Synchronized menu options 152 provide user 126 with assistance options presented by interactive voice response system 148 that are tailored to the probable subject matter identified from session information 150. For example, synchronized menu options 152 may provide user 126 with a dynamically generated list of options, topics, or commands that have been identified as correlating to probable desired user interactions based on session information 150.

Assistant manager 140 therefore provides tightly integrated assistance between interactive voice response system 148 and application 118. Because session information 150 is shared between interactive voice response system 148 and application 118, a live agent has access to the web session information. Assistance manager 140 monitors and synchronizes user input 138 to interactive voice response system 148 and user input 138 to application 118. User 126 can obtain assistance 142 by selecting synchronized menu options 152 from interactive voice response system 148 or by user input 138 into application 118.

In the illustrative example, assistance 142 also includes audio assistance 156 and visual assistance 154. Audio assistance 156 is a group of audio files on how to use application 118 at location 144 of page 136. As depicted, audio assistance 156 provides verbal assistance or instructions on how to use application 118 at location 144. Visual assistance 154 is a group of video files on how to use application 118 at location 144 of page 136. As depicted, visual assistance 154 provides visual assistance or instructions on how to use application 118 at location 144.

In response to a selection of one of synchronized menu options 152, assistance manager 140 may provide audio assistance 156 on client device 116 through audio system 128 separate from, or in conjunction with the visual assistance 154 displayed in graphical user interface 122 on display system 124. In this manner, assistance manager 140 provides assistance 142 in a form of instructions on how user input 138 should be made to location 144. In other words, assistance 142 is provided based on a selection from user 126 of one of synchronized menu options 152.

As part of visual assistance 154, assistance manager 140 may generate a group of graphical indicators that is displayed in conjunction with location 144 of the 136. The group of graphical elements 146 may aid in presenting assistance 142 on how to use application 118 at location 144.

As depicted, the group of graphical indicators provided as part of visual assistance 154 may take different forms. For example, the group of graphical indicators may include at least one of highlighting, a color, an icon, an animation, underlining, bolding, italics, a font size, a font type, or other suitable types of graphical indicators that may serve to obtain the attention of user 126, aid in providing visual assistance 154 on how to use application 118, or some combination thereof.

In one illustrative example, one or more technical solutions are present that overcome a technical problem with obtaining assistance with an issue for an application as quickly as desired. As a result, one or more technical solutions may provide a technical effect in which assistance 142 is provided by interactive voice response system 148 that addresses how to use application 118 in a particular location where user 126 may be having difficulties.

As a result, computer system 108 operates as a special purpose computer system in which assistance manager 140 in computer system 108 enables providing assistance 142 that is directed to an issue that user 126 may have at a particular location in application 118. In particular, assistance manager 140 transforms computer system 108 into a special purpose computer system as compared to currently available general computer systems that do not have assistance manager 140.

For example, computer system 108 with assistance manager 140 provides assistance 142 that is tightly integrated between interactive voice response system 148 and application 118. This integration between interactive voice response system 148 and application 118 is provided in a manner that addresses an issue that user 126 may have in using application 118. For example, assistance 142 may present synchronized menu options 152 based on a probable subject matter with which user 126 desires assistance, identified from session information 150 of application 118. Based on a selection from synchronized menu options 152, computer system 108 with assistance manager 140 may provide assistance 142.

Assistance 142 is provided without user 126 having to open another browser, initiate a separate interactive voice response system, or duplicate a separate system. Assistance 142 is provided as part of application 118. Additionally, assistance manager 140 reduces the need for having live online assistance.

Additionally, assistance manager 140 also reduces the frustration of navigating an interactive voice response system due to the resubmission of information previously entered as part of a web session. Previous applications that do not have assistance manager 140 require more time and effort than desired when user 126 is working to complete a task or operation using application 118 and is unable to complete the task or operation without assistance 142. For example, user 126 may be completing application information for a loan, changing benefits, performing a trade, or some other task or operation. The time involved with having to interrupt or halt the operation and obtain information about the application from a separate, non-integrated assistance system may be reduced with assistance manager 140.

Figure 2:
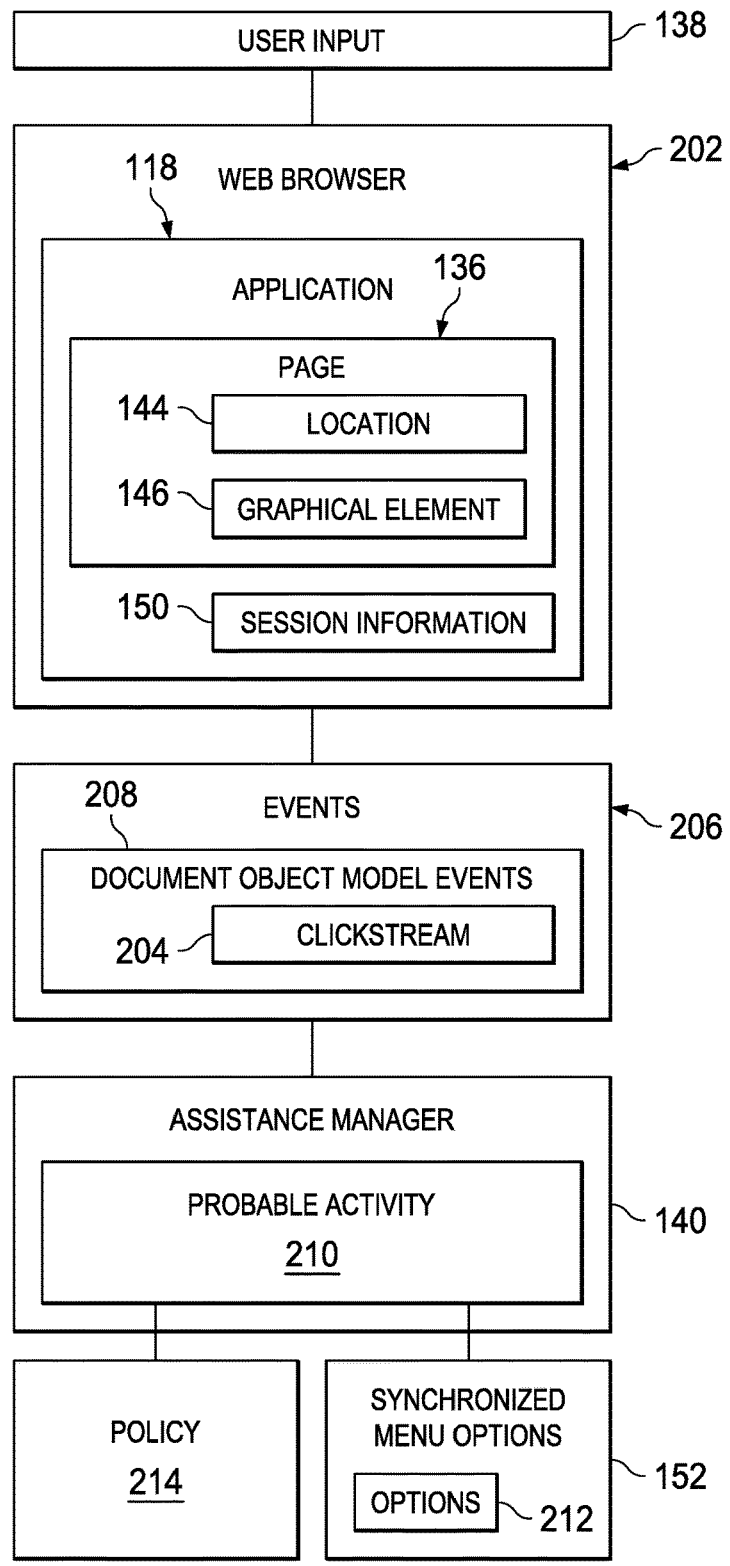
FIG. 2 is a data flow diagram for monitoring user input to identify probable activities depicted in accordance with an illustrative embodiment.

With reference to FIG. 2, a data flow diagram for monitoring user input to identify probable activities is depicted in accordance with an illustrative embodiment. In the illustrative examples, the same reference numeral may be used in more than one figure. This reuse of a reference numeral in different figures represents the same element in the different figures.

As depicted, assistance manager 140 monitors page 136 in application 118 for user input 138 to determine whether assistance 142, shown in block form in FIG. 1, is needed for application 118. In this illustrative example, application 118 runs in web browser 202 displayed on display system 124 for client device 116, both shown in block form in FIG. 1.

In this illustrative example, the monitoring includes indirect monitoring of user input 138 at location 144 of page 136. Assistance manager 140 logs user input 138 at location 144 of page 136 as session information 150.

In other illustrative examples, user input 138 may be monitored directly as generated by user input 138 at graphical element 146. In response to user input 138 at graphical element 146, assistance manager 140 identifies session information 150, including clickstream 204.

Clickstream 204 is session information 150 that provides a record of the parts of page 136, including location 144, that user 126, shown in block form in FIG. 1, attempts to access through user input 138 while using application 118. As user 126 attempts to interact with location 144 of page 136, assistance manager 140 logs user input 138 as part of clickstream 204.

As depicted, assistance manager 140 monitors user input 138. For example, assistance manager 140 may be implemented as part of application 118 that monitors activity on web browser 202. The activity may be user input 138.

For example, user input 138 is monitored indirectly through monitoring events 206 generated by user input 138 made to page 136 for application 118 running in web browser 202. In this illustrative example, web browser 202 generates events 206.

As depicted, events 206 are document object model events 208. Assistance manager 140 may include JavaScript that is configured to monitor document object model events 208. Document object model events 208 in this illustrative example are selected from at least one of a mouse event, a keyboard event, a touchscreen event, a device event, or some other suitable type of event.

Assistance manager 140 uses document object model events 208 to identify location 144 for user input 138. In other words, location 144 is where user input 138 has been made. A record of location 144 where user input 138 has been made is stored as part of clickstream 204.

Further, assistance manager 140 determines at least one probable activity 210 from events 206 in clickstream 204. Probable activity 210 is a subject matter of an attempted operation by user 126 at location 144 in application 118. Location 144 may be a location selected by user 126, shown in block form in FIG. 1, to access information into application 118. For example, when application 118 is web application 120, shown in block form in FIG. 1, location 144 may be a text box, a drop-down menu, a check box, or some other region in web page 136.

The determination of probable activity 210 from events 206 in clickstream 204 may be identified by assistance manager 140 applying policy 214 to events 206. Policy 214 is a group of rules that identify one or more probable activity 210 of an attempted operation by user 126 at location 144. As used herein, "a group of", when used with reference to items, means one or more items. For example, "a group of rules" is one or more rules.

For example, a rule in policy 214 may indicate probable activity 210 when events 206 in clickstream 204 match statistical models of information 104. For example, if one of events 206 is repeated in clickstream 204 more than the threshold number of times, user 126 may be considered to be having difficulty in performing an operation on location 144. Assistance manager 140 may therefore identify one or more probable activity 210 related to accessing information 104 at location 144 of page 136.

In another example, assistance manager 140 performs a statistical comparison of events 206 in clickstream 204 to information 104 in order to determine a probable activity 210 of the attempted interaction of user 126 location 144 of page 136. Assistance manager 140 extracts events 206 relevant to location 144 from session information 150. Assistance manager 140 compares events 206 to statistical models of information 104 to determine similarities using known statistical classification methods, such as K-nearest neighbor, Gaussian mixture modeling, support vector machines, vector quantization, hidden Markov modeling, and multivariate auto-regression modeling. The probable activity 210, or a number of probable activities 210, can then be determined.

As another example, assistance manager 140 may monitor how long user 126 has attempted to interact with location 144 of page 136. Another rule in policy 214 may identify one or more probable activity 210 related to accessing information 104 at location 144 of page 136 when user 126 has selected a text box in location 144, but has not entered information for a period of time that is greater than some threshold amount of time. As depicted, assistance manager 140 may include JavaScript that is configured to monitor document object model events 208.

Based on identifying probable activity 210, assistance manager 140 can present synchronized menu options 152 to user 126. In an illustrative example, each of probable activity 210 identified by assistance manager 140 is presented to user 126, in interactive voice response system 148. Each of options 212 corresponds to one of probable activities 210 identified by assistance manager 140 based on application of policy 214 to events 206 in clickstream 204.

These examples of rules are not meant to limit the rules that may be implemented in policy 214. Other types of rules may be implemented in policy 214 depending on the particular implementation.

Figure 3:
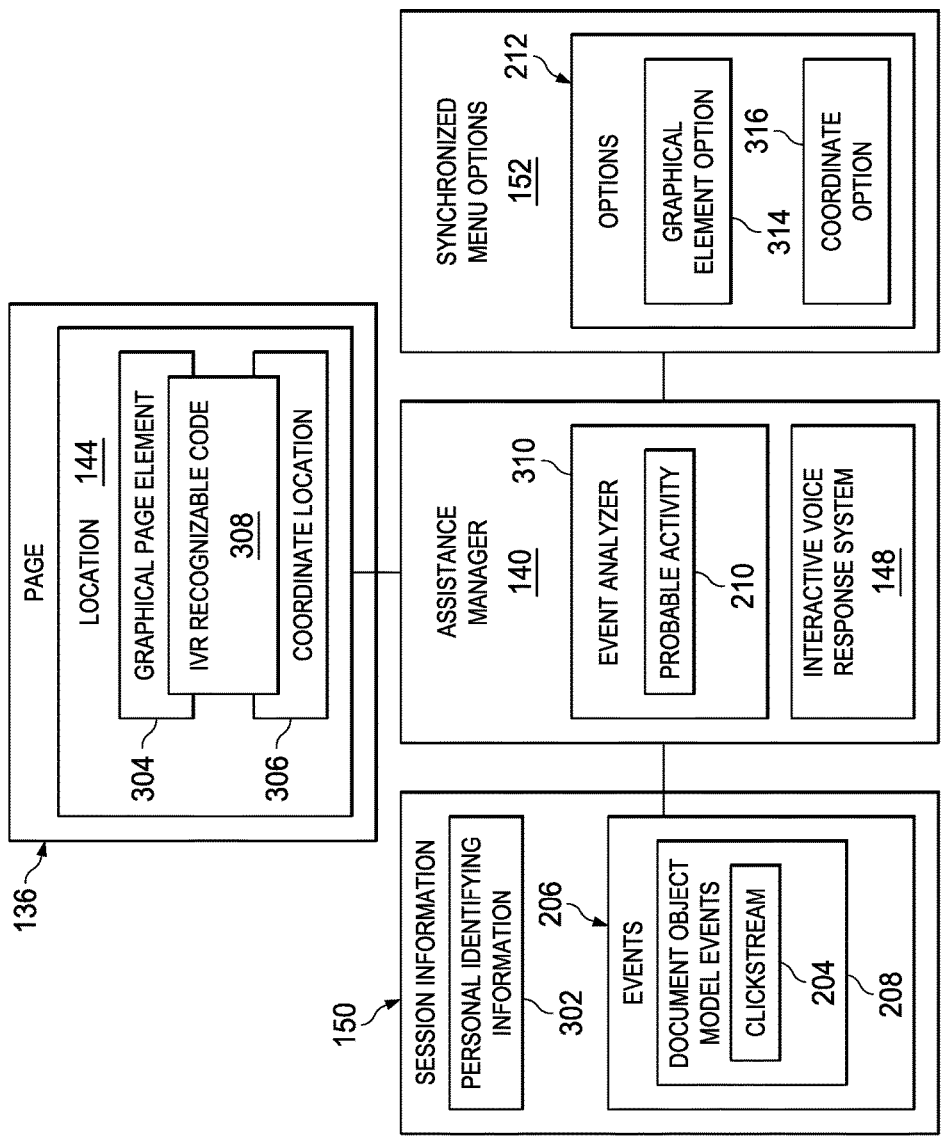
FIG. 3 is a data flow diagram for generating synchronized menu options for providing assistance within an interactive voice response system for an issue at a location and an application depicted in accordance with an illustrative embodiment.

Turning now to FIG. 3, a data flow diagram for generating synchronized menu options for providing assistance within an interactive voice response system for an issue at a location and an application is depicted in accordance with an illustrative embodiment. In this illustrative example, assistance manager 140 generates synchronized menu options 152.

In response receiving an interaction with graphical element 146, shown in block form in FIG. 1, requesting assistance with location 144, assistance manager 140 identifies session information 150. As depicted, session information 150 includes a number of different components. As used herein, a "number of items" means one or more items. For example, "a number of different components" means one or more components. As depicted, session information 150 includes events 206 and personal identifying information 302.

Assistance manager 140 uses personal identifying information 302 of user 126 in the context of application 118, both shown in block form in FIG. 1. In one illustrative example, personal identifying information 302 is login information submitted by user 126 to application 118. Assistance manager 140 can replicate personal identifying information 302 when launching interactive voice response system 148. This replication of personal identifying information 302 and the need for duplicative submission of information by user 126 when assistance with location 144 is requested through interactive voice response system 148.

User input 138, shown in block form in FIG. 1, is monitored indirectly through events 206 generated by the attempted interactions with location 144 of page 136. As depicted, events 206 are document object model events 208. Assistance manager 140 may include JavaScript that is configured to monitor document object model events 208. Document object model events 208 in this illustrative example are selected from at least one of a mouse event, a keyboard event, a touchscreen event, a device event, or some other suitable type of event.

Events 206 are stored in clickstream 204. Clickstream 204 is session information 150, shown in block form in FIG. 1, that provides a record of the attempted interaction from user 126. In this illustrative example, clickstream 204 include document object model events 208 directed towards location 144 of page 136.

Location 144 includes at least one of a text box, a check box, a drop-down menu, a region, or some other element in page 136 for application 118 where user input 138 may be made. As depicted, location 144 includes graphical page element 304 and coordinate location 306.

Graphical page element 304 is a graphical element displayed within page 136 with which the user can interact via user input 138, shown in block form in FIG. 1. Graphical page element 304 may include at least one of animations, text, icons, images, or other suitable types of graphical indicators.

Coordinate location 306 is an (X, Y) coordinate location within page 136. In one illustrative example, coordinate location 306 is a location within a document-centric coordinate system, wherein a zero point of the coordinate system is at an upper left corner of page 136. Alternatively, coordinate location 306 is a location within a window-centric coordinate system, wherein a zero point of the coordinate system is at the upper left corner of a current visible area of page 136 as a window of the graphical user interface 122, shown in block form in FIG. 1.

Location 144 includes interactive voice response (IVR) recognizable code 308. IVR recognizable code 308 is one or more instructions associated with location 144 that enable user 126 to interact with location 144 through voice input submitted through interactive voice response system 148. IVR recognizable code 308 can be implemented using standards such as voice extensible markup language (VoiceXML), call control extensible markup language (CCXML), speech recognition grammar specification (SRGS), speech synthesis markup language (SSML), or other suitable standards.

Assistance manager 140 analyzes the events 206 and clickstream 204 to determine synchronized menu options 152. In one illustrative sample, assistance manager 140 includes event analyzer 310. Event analyzer 310 performs a statistical comparison of events 206 to determine probable activity 210 of the attempted interaction of user input 138 with location 144 of page 136. Event analyzer 310 extracts events 206 relevant to location 144 from clickstream 204. Assistance manager 140 compares the extracted ones of events 206 to statistical models to determine similarities using known statistical classification methods, such as K-nearest neighbor, Gaussian mixture modeling, support vector machines, vector quantization, hidden Markov modeling, and multivariate auto-regression modeling. Based on this comparison by event analyzer 310, assistance manager 140 determines synchronized menu options 152.

Assistance manager 140 generates synchronized menu options 152 based on probable activity 210 identified from clickstream 204 by event analyzer 310. As illustrated, synchronized menu options 152 is a list of options 212. In this illustrative example, each of options 212 corresponds to a different one of probable activity 210 is identified by event analyzer 310. As depicted, options 212 includes graphical element option 314 and coordinate option 316.

Graphical element option 314 is an option within options 212 that corresponds to graphical page element 304. Graphical element option 314 is presented to and is selectable by user 126 through voice input entered into interactive voice response system 148.

Coordinate option 316 is an option within options 212 that corresponds to coordinate location 306. Coordinate option 316 is presented to and is selectable by user 126 through voice input entered into interactive voice response system 148.

Figure 4:
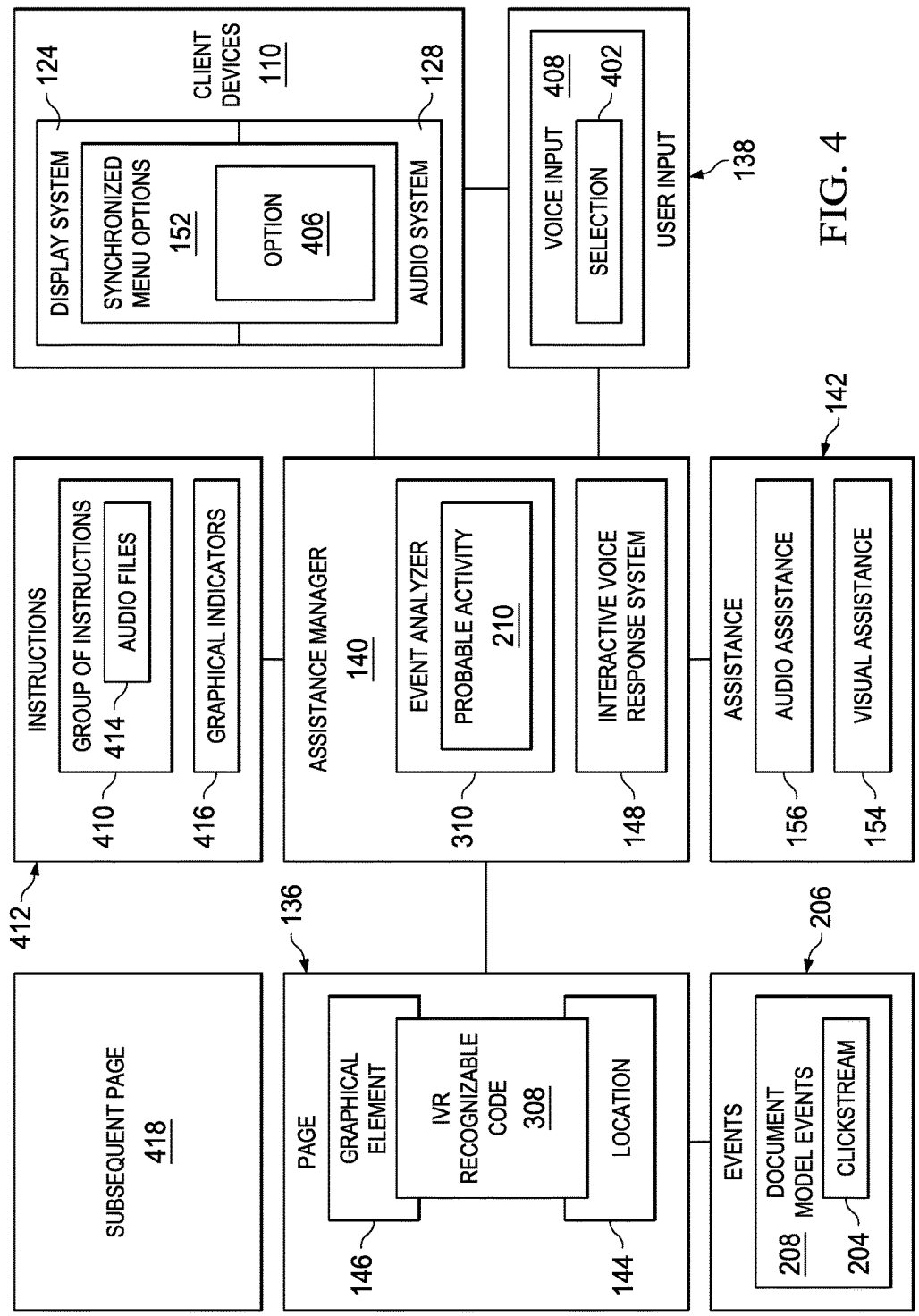
FIG. 4 is a data flow diagram for providing assistance based on a selection from synchronized menu options within an interactive voice response system depicted in accordance with an illustrative embodiment.

Turning now to FIG. 4, a data flow diagram for providing assistance based on a selection from synchronized menu options within an interactive voice response system is depicted in accordance with an illustrative embodiment. In this illustrative example, assistance manager 140 provides assistance 142.

In response to generating synchronized menu options 152, assistance manager 140 presents synchronized menu options 152 on client devices 110. As depicted, synchronized menu options 152 are presented aurally by interactive voice response system 148 using audio system 128 of client devices 116. In conjunction with presentations in audio system 128, synchronized menu options 152 can be presented visually within application 118, shown in block form in FIG. 1, displayed on display system 124.

As depicted, user 126, shown in block form in FIG. 1, makes selection 402 of option 406 in response to the presentation of synchronized menu options 152 by assistance manager 140. Selection 402 is made through user input 138.

As depicted, user input 138 is a voice input 408. Voice input 408 is a selection 402 of option 406 entered into interactive voice response system 148 through audio system 128. In one illustrative example, user 126 can enter voice input 408 by using microphones 132, shown in block form in FIG. 1.

As depicted, assistance manager 140 identifies group of instructions 410 in instructions 412 for providing assistance 142 for location 144. Each location may have a different group of instructions 410 in instructions 412 that are selected for each particular location. In some cases, more than one location 144 in application 118 may be associated with the same group of instructions 410.

As depicted, instructions 412 may be stored as information 104 in storage system 112, shown in block form in FIG. 1, such that each group of instructions 410 in instructions 412 is located in a file. In other illustrative examples, instructions 412 may be stored as a single file or other type of data structure.

Group of instructions 410 may identify a group of audio files 414. The identification of the group of audio files 414 is made based on location 144. For example, each audio file in audio files 414 may be associated with a particular location in application 118 or with a different group of instructions 410 in instructions 412. In some cases, the same audio file may be associated with more than one location in application 118. The group of audio files 414 identified for location 144 is audio assistance 156 for location 144. As depicted, the group of audio files 414 contains verbal instructions about location 144 for which user 126 may need assistance 142.

As depicted, instructions 412 may identify a group of graphical indicators 416. The identification of the group of graphical indicators 416 is made based on location 144. For example, each graphical indicator in graphical indicators 416 may be associated with a particular location in application 118 or with a different group of instructions 410 in instructions 412. In some cases, the same graphical indicator may be associated with more than one location in application 118. The group of graphical indicators 416 identified for location 144 is a visual assistance 154 for location 144. As depicted, the group of graphical indicators 416 may include at least one of flashing text, animation, bolding, font size showing example entries for user input, or other suitable visual information that may be displayed to provide user 126 with assistance 142 for location 144.

As depicted, location 144 and graphical element 146 are each included with IVR recognizable code 308. In one illustrative example, selection 402 of option 406 through voice input 408 into interactive voice response system 148 causes a corresponding action within page 136 of application 118, depicted in block form in FIG. 1. For example, selection 402 may correspond to IVR recognizable code 308 associated with location 144 of page 136. Application 118 performs an action at location 144 corresponding to selection 402 of option 406.

In another illustrative example, selection 402 of option 406 may correspond to IVR recognizable code 308 associated with location 144 of page 136. Application 118 performs an action at graphical element 146 corresponding to selection 402 of option 406.

In one illustrative example, the action at graphical element 146 may cause application 118 to navigate to subsequent page 418. Assistance manager 140 may provide additional assistance with subsequent page 418 in order to accomplish the desired activity.

The illustration of information environment 100 and the different components in information environment 100 shown in block form in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, assistance manager 140 is shown as a component interacting with computer system 108 and client devices 110. As depicted, assistance manager 140 may be in client devices 110, computer system 108, or some combination thereof. For example, assistance manager 140 may include one or more components that run on client devices 110 in one or more components that run on computer system 108. These components may be client/server components.

For example, a first component in assistance manager 140 may be located on client device 116 and identify when assistance 142 is needed for location 144 for application 118. A second component in assistance manager 140 may be located in computer system 108 and identify the group of audio files 414.

In yet another illustrative example, the group of audio files 414 may include text. The text in the group of audio files 414 may be converted to speech for audio assistance 156. For example, a speech synthesis process may be used to convert written text in the group of audio files 414 into human speech. In another illustrative example, the text may be associated with or as part of instructions 412 in FIG. 4.

In yet another illustrative example, the group of audio files 414 may also include audio assistance 156 for subsequent page 418 in addition to or in place of location 144 of page 136. In other words, assistance manager 140 may provide continued assistance with subsequent page 418 that is encountered as well as with interactions that are necessary within subsequent page 418 in order to accomplish a user's desired interaction.

Figure 5:
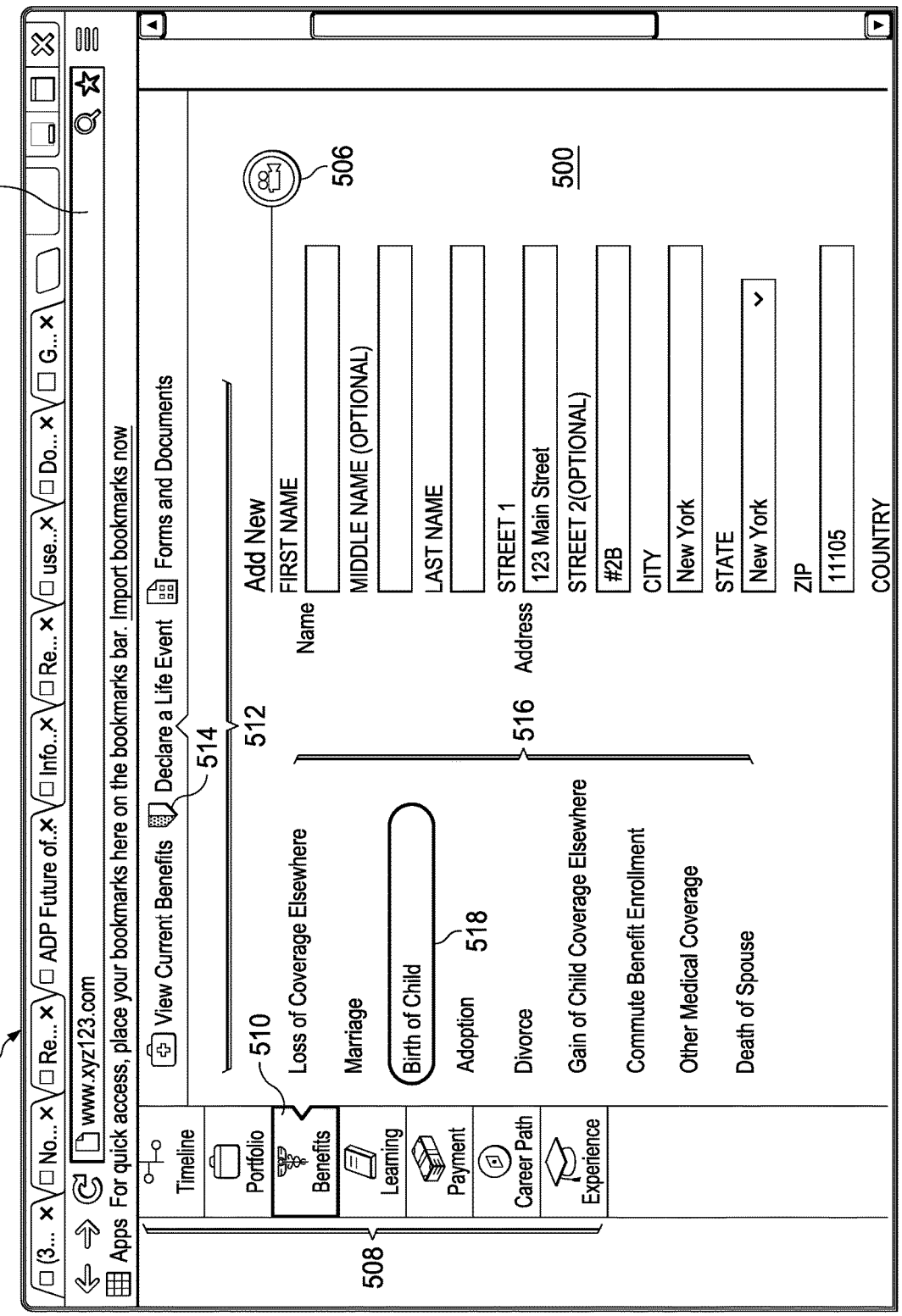
FIG. 5 is an illustration of a page for an application are depicted in accordance with illustrative embodiments.

With reference now to FIG. 5, an illustration of a page for an application is depicted in accordance with illustrative embodiments. Page 500 is an example of page 136, depicted in block form in FIG. 1.

In this depicted example, page 500 is for application 502 in web browser 504. Application 502 is an employee benefits application.

As depicted, page 500, and application 502, and web browser 504 are graphical representations of software and information for page 136 and application 118, shown in block form in FIG. 1. The graphic representations of these figures are displayed in display system 124 for client device 116 shown in block form in FIG. 1 in this illustrative example.

IVR assistance indicator 506 is displayed within page 500. As depicted, IVR assistance indicator 506 is a graphical indicator, such as graphical element 146 shown in block form in FIG. 1, which indicates that assistance with page 500 is available via an interactive voice response system.

In this particular example, IVR assistance indicator 506 is displayed when the user reaches page 500. In another illustrative example, IVR assistance indicator 506 may be displayed when an event occurs. For example, the event may be when the user does not enter any user input into page 500 for some period of time, when the user does not submit information entered into page 500, or some other similar event.

In this illustrative example, page 500 includes a number of different locations that are selectable by user. As depicted, locations 508 depicts a top level in a hierarchical menu tree showing a number of applications that are can be accessed from web browser 504. As depicted, locations 508 include "timeline," "portfolio," "benefits," "learning," "payment," "career path," and "experience." As depicted, benefits 510 is selected from locations 508.

In this illustrative example, selection of benefits 510 displays a second level in the hierarchical menu tree that includes locations 512. As depicted, locations 512 includes "view current benefits," "declare a life event," and "forms and documents." As depicted, "declare a life event" 514 is selected from location 512.

In this illustrative example, selection of "declare a life event" 514 displays a third level in the hierarchical menu tree that includes locations 516. As depicted, locations 516 includes "loss of coverage elsewhere," "marriage," "birth of a child," "adoption," "divorce," "gain of child coverage elsewhere," "commute benefit enrollment," "other medical coverage," and "death of spouse." As depicted, "birth of a child" 518 is selected from location 516.

In the illustrative example, IVR assistance indicator 506 is selectable by user input to initiate an interactive voice response system, such as interactive voice response system 148, shown in block form in FIG. 1. When IVR assistance indicator 506 is selected, and interactive voice response session is initiated with the user, and presents synchronized menu options 152, shown in block form in FIG. 1, to a user based on session information 150, shown in block form in FIG. 1.

In this illustrative example, one or more of locations 508, location 512, and locations 516 are encoded with IVR recognizable code, such as IVR recognizable code 308, shown in block form in FIG. 3. When a user makes a selection from synchronized menu options presented in the IVR session, the IVR recognizable code allows application 502 to make a corresponding selection of one of application locations 508, locations 512, and locations 516 based on voice input to the IVR system.

In the examples in FIG. 5, the user initiates the assistance from an interactive voice response system by selecting IVR assistance indicator 506. In other illustrative examples, the assistance may be started automatically without requiring the user to initiate the assistance of an assistance indicator. In still other illustrative examples, the location and assistance may be provided for a page or screen on a native application, instead of a web page for a web application.

Figure 6:
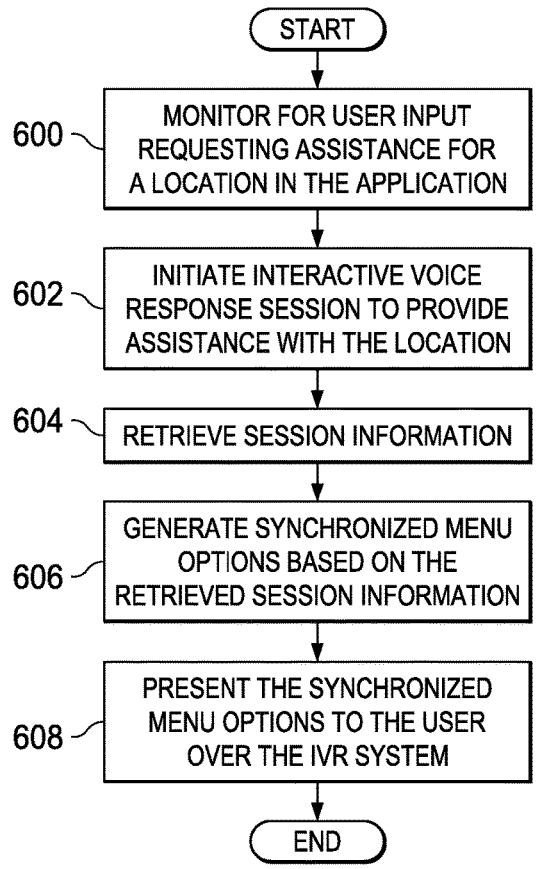
FIG. 6 is a flowchart of a process for initiating assistance via an interactive voice response system for an application depicted in accordance with an illustrative embodiment.

With reference now to FIG. 6, a flowchart of a process for initiating assistance via an interactive voice response system for an application is depicted in accordance with an illustrative embodiment. The process depicted in this flowchart may be implemented in assistance manager 140 in computer system 108 shown in block form in FIG. 1.

The process begins by monitoring for a user input requesting assistance for a location in the application (step 600). The process initiates an interactive voice response session to provide assistance with the location (step 602).

The process retrieves session information (step 604). The session information can be, for example, session information 150, shown in block form in FIG. 1. The session information 150 can include, for example, personal identifying information of the user, state information for the application, and clickstream information for user input into the application.

The process then generates synchronized menu options based on the retrieved session information (step 606). The synchronized menu options can be, for example, synchronized menu options 152, shown in block form in FIG. 1. The process generates synchronized menu options based on probable subject matter identified from the session information. The synchronized menu options are a list of options, topics, or commands designed to provide a user with assistance for accessing information corresponding to the identified probable subject matter.

The process then presents these synchronized menu options to the user over the IVR system (step 608), with the process terminating thereafter. Because synchronized menu options are generated based on session information of the application, a user can avoid duplicating entry of information into the interactive voice response system that was previously entered into the application.

Figure 7:
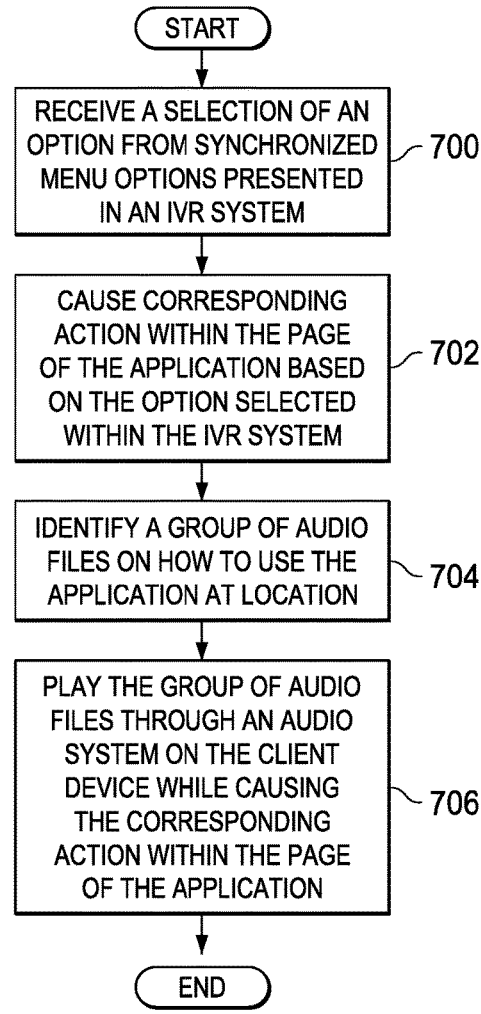
FIG. 7 is a flowchart of a process for providing assistance via an interactive voice response system for an application depicted in accordance with an illustrative embodiment.

With reference now to FIG. 7, a flowchart of a process for providing assistance via an interactive voice response system for an application is depicted in accordance with an illustrative embodiment. The process depicted in this flowchart may be implemented in assistance manager 140 in computer system 108 shown in block form in FIG. 1.

The process begins by receiving a selection of an option from synchronized menu options presented in an interactive voice response system (step 700). In this illustrative example, the selected option corresponds to a location in a page of an application.

The process causes a corresponding action within the page of the application based on the option selected within the IVR system (step 702). In this manner, the assistance is provided by the graphical element with the portion of the web page at the location, the animation, and the presentation of the audio file.

The process identifies a group of audio files on how to use the application at the location (step 704). The process then plays the group of audio files through an audio system on the client device while the causing the corresponding action within the page of the application (step 706) with the process terminating thereafter. In this manner, the assistance is provided with identified probable activities through an interactive voice response system based on logged user interaction within the application.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
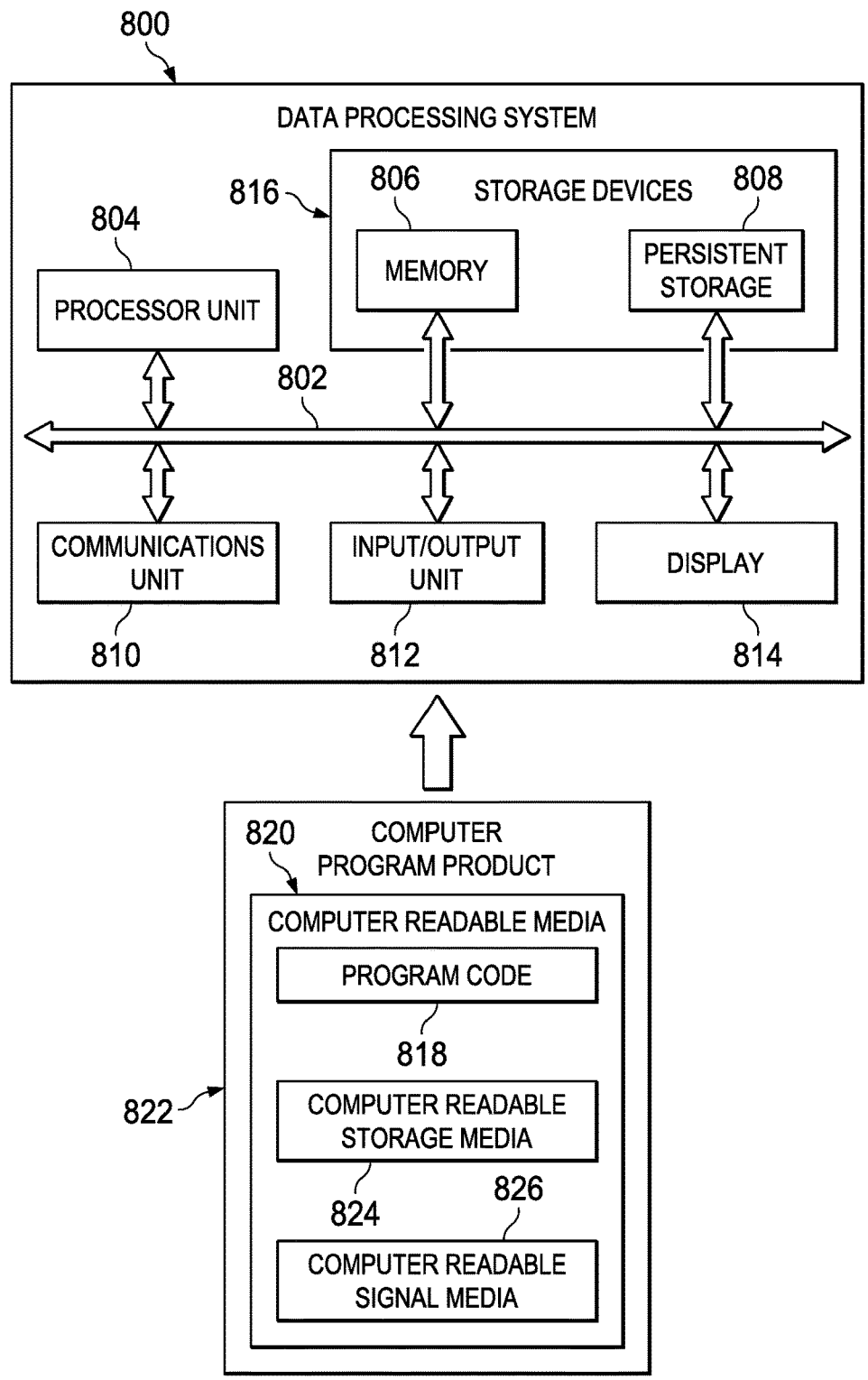
FIG. 8 is a block diagram of a data processing system in accordance with an illustrative embodiment.

Turning now to FIG. 8, a block diagram of a data processing system is depicted in accordance with an illustrative embodiment. Data processing system 800 may be used to implement one or more data processing systems in computer system 108 and client devices 110 shown in block form in FIG. 1. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or on both a temporary basis and a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826. In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, the illustrative embodiments provide a method and apparatus for providing assistance to a user of an application. In the illustrative examples, an assistance manager identifies user input requesting assistance with a location within the page of the application displayed on a display system for a client device. Further, the assistance manager identifies session information for the application by the computer system in response to identifying the user input requesting assistance. Still further, the assistance manager generates synchronized menu options within the application for an interactive voice response system based on the session information identified for the application. Still further, the assistance manager presents the synchronized menu options to the user within the interactive voice response system to provide the assistance.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for providing assistance for an application, the method comprising:
   identifying, by a computer system, user input requesting assistance with a location within a page of the application;
   responsive to identifying the user input requesting assistance, identifying, by the computer system, session information for the application;
   statistically modelling, by the computer system, the session information to identify different probable activities associated with the location within the page of the application;
   generating, by the computer system, synchronized menu options within the application for an interactive voice response system based on the different probable activities identified from the statistically modeled session information for the application, wherein the synchronized menu options is a dynamically generated list of options that each correspond to a different one of the different probable activities; and
   presenting, by the computer system, the synchronized menu options in the application to access the interactive voice response system.

2. The method of claim 1, further comprising:
   displaying, by the computer system, a graphical indicator in association with the session information, wherein the graphical indicator indicates that the assistance is available through the interactive voice response system; and
   retrieving, by the computer system, the session information when the graphical indicator is selected.

3. The method of claim 1, wherein the location is selected from at least one of a graphical page element and a coordinate location on the page, wherein the location is encoded with program code recognizable to the interactive voice response system.

4. The method of claim 3, wherein the coordinate location on the page corresponds to one of a control element such as a text box, a check box, and a drop-down menu.

5. The method of claim 3, wherein the graphical page element is selected from one of a window, a tooltip, a pop-up window, a modal window, and an in-line element.

6. The method of claim 1, further comprising:
   monitoring, by a computer system, for a user input to the location within the page of the application; and
   logging a clickstream of the user input to the location.

7. The method of claim 6, wherein the session information comprises information identifying user and the clickstream, wherein generating the synchronized menu options further comprises:
   analyzing, by the computer system, the clickstream to identify a probable activity associated with the location within the page of the application; and
   generating, by the computer system, the synchronized menu options based on the clickstream to include options related to the probable activity.

8. The method of claim 7, further comprising:
   receiving, by the computer system, a selection from the user of one of the synchronized menu options, wherein the selection is received from the interactive voice response system; and
   providing, by the computer system, assistance with the location.

9. The method of claim 8, wherein the assistance is selected from at least one of voice prompts from the interactive voice response system, visual prompts displayed on a display system, routing the session information to an assistance personnel, and sharing an application window displayed on the display system with the assistance personnel.

10. The method of claim 8, further comprising:
    responsive to providing the assistance with the location, displaying, by the computer system, a subsequent page related to the probable activity on a display system; and
    providing, by the computer system, assistance with the subsequent page.

11. The method of claim 6, wherein monitoring for the user input to the location within the page of the application comprises:
    monitoring document object model events for at least one of mouse events, keyboard events, user interface events, or hypertext markup language events.

12. The method of claim 1, wherein the application is selected from one of an accounting application, a human capital management application, a benefits administration program, and a database application.

13. The method of claim 1, wherein the synchronized menu options are presented on a client device selected from one of a personal computer, a workstation, a kiosk, a laptop computer, a mobile phone, a tablet computer, and a game console.

14. A computer system comprising:
an assistance manager for providing assistance for an application, wherein the assistance manager is configured:
to identify user input requesting assistance with a location within a page of the application;
to identify session information for the application in response to identifying the user input requesting assistance;
to statistically model the session information to identify different probable activities associated with the location within the page of the application
to generate synchronized menu options within the application for an interactive voice response system based on the different probable activities identified from the statistically modeled session information for the application, wherein the synchronized menu options is a dynamically generated list of options that each correspond to a different one of the different probable activities; and
to present the synchronized menu options to the user within the interactive voice response system.

15. The computer system of claim 14, wherein the assistance manager is further configured:
to display a graphical indicator in association with the session information, wherein the graphical indicator indicates that the assistance is available through the interactive voice response system; and to retrieve the session information when the graphical indicator is selected.

16. The computer system of claim 14, wherein the location is selected from at least one of a graphical page element and a coordinate location on the page, wherein the location is encoded with program code recognizable to the interactive voice response system.

17. The computer system of claim 16, wherein the coordinate location on the page corresponds to one of a text box, a check box, and a drop-down menu.

18. The computer system of claim 16, wherein the graphical page element is selected from one of a window, a tooltip, a pop-up window, a modal window, and an in-line element.

19. The computer system of claim 14, wherein assistance manager is further configured:
to monitor for a user input to the location within the page of the application; and
to log a clickstream of the user input to the location.

20. The computer system of claim 19, wherein the session information comprises information identifying user and the clickstream, wherein generating the synchronized menu options further comprises:
analyzing the clickstream to identify a probable activity associated with the location within the page of the application; and
generating the synchronized menu options based on the clickstream to include options related to the probable activity.

21. The computer system of claim 20, wherein the assistance manager is further configured:
to receive a selection from the user of one of the synchronized menu options, wherein the selection is received from the interactive voice response system; and to provide assistance with the location.

22. The computer system of claim 21, wherein the assistance is selected from at least one of voice prompts from the interactive voice response system, visual prompts displayed on a display system, routing the session information to an assistance personnel, and sharing an application window displayed on the display system with the assistance personnel.

23. The computer system of claim 21, wherein the assistance manager is further configured:
to display a subsequent page related to the probable activity on a display system in response to providing the assistance with the location; and to provide assistance with the subsequent page.

24. The computer system of claim 19, wherein monitoring for the user input to the location within the page of the application comprises:
monitoring document object model events for at least one of mouse events, keyboard events, user interface events, or hypertext markup language events.

25. The computer system of claim 14, wherein the application is selected from one of an accounting application, a human resources application, a benefits administration program, and a database application.

26. The computer system of claim 14, wherein the synchronized menu options are presented on a client device selected from one of a personal computer, a workstation, a kiosk, a laptop computer, a mobile phone, a tablet computer, and a game console.

27. A computer program product for providing assistance for an application, the computer program product comprising:
computer readable storage media;
first program code, stored on the computer readable storage media, for identifying user input requesting assistance with a location within a page of the application;
second program code, stored on the computer readable storage media, for identifying session information for the application in response to identifying the user input requesting assistance;
program code, stored on the computer readable storage media, for statistically modelling, by the computer system, the session information to identify different probable activities associated with the location within the page of the application;
third program code, stored on the computer readable storage media, for generating synchronized menu options within the application for an interactive voice response system based on the different probable activities identified from the statistically modeled session information for the application, wherein the synchronized menu options is a dynamically generated list of options that each correspond to a different one of the different probable activities; and
fourth program code, stored on the computer readable storage media, for presenting the synchronized menu options to the user within the interactive voice response system.

28. The computer program product of claim 27, further comprising:
fifth program code, stored on the computer readable storage media, for displaying a graphical indicator in association with the session information, wherein the graphical indicator indicates that the assistance is available through the interactive voice response system; and sixth program code, stored on the computer readable storage media, for retrieving the session information when the graphical indicator is selected.

29. The computer program product of claim 27, wherein the location is selected from at least one of a graphical page element and a coordinate location on the page, wherein the location is encoded with program code recognizable to the interactive voice response system.

30. The computer program product of claim 29, wherein the coordinate location on the page corresponds to one of a text box, a check box, and a drop-down menu.

31. The computer program product of claim 29, wherein the graphical page element is selected from one of a window, a tooltip, a pop-up window, a modal window, and an in-line element.

32. The computer program product of claim 27, further comprising:
fifth program code, stored on the computer readable storage media, for monitoring a user input to the location within the page of the application; and
sixth program code, stored on the computer readable storage media, for logging a clickstream of the user input to the location.

33. The computer program product of claim 32, wherein the session information comprises information identifying user and the clickstream, wherein the third program code for generating the synchronized menu options further comprises:
program code, stored on the computer readable storage media, for analyzing the clickstream to identify a probable activity associated with the location within the page of the application; and
program code, stored on the computer readable storage media, for generating the synchronized menu options based on the clickstream to include options related to the probable activity.

34. The computer program product of claim 33, further comprising:
seventh program code, stored on the computer readable storage media, for receiving a selection from the user of one of the synchronized menu options, wherein the selection is received from the interactive voice response system; and
eighth program code, stored on the computer readable storage media, for providing assistance with the location.

35. The computer program product of claim 34, wherein the assistance is selected from at least one of voice prompts from the interactive voice response system, visual prompts displayed on a display system, routing the session information to an assistance personnel, and sharing an application window displayed on the display system with the assistance personnel.

36. The computer program product of claim 34, further comprising:
ninth program code, stored on the computer readable storage media, for displaying a subsequent page related to the probable activity on a display system in response to providing the assistance with the location; and
tenth program code, stored on the computer readable storage media, for providing assistance with the subsequent page.

37. The computer program product of claim 32, wherein the fifth program code for monitoring for the user input to the location within the page of the application comprises:
program code, stored on the computer readable storage media, for monitoring document object model events for at least one of mouse events, keyboard events, user interface events, or hypertext markup language events.

38. The computer program product of claim 27, wherein the application is selected from one of an accounting application, a human resources application, a benefits administration program, and a database application.

39. The computer program product of claim 27, wherein the synchronized menu options are presented on a client device selected from one of a personal computer, a workstation, a kiosk, a laptop computer, a mobile phone, a tablet computer, and a game console.

* * * * *